(12) United States Patent
Kohiga

(10) Patent No.: US 8,051,333 B2
(45) Date of Patent: Nov. 1, 2011

(54) MEMORY FAILURE RECOVERY METHOD, INFORMATION PROCESSING APPARATUS, AND PROGRAM

(75) Inventor: Akihito Kohiga, Tokyo (JP)

(73) Assignee: NEC Corporation, Tokyo (JP)

( * ) Notice: Subject to any disclaimer, the term of this patent is extended or adjusted under 35 U.S.C. 154(b) by 167 days.

(21) Appl. No.: 12/525,952

(22) PCT Filed: Feb. 8, 2008

(86) PCT No.: PCT/JP2008/052173
§ 371 (c)(1),
(2), (4) Date: Aug. 5, 2009

(87) PCT Pub. No.: WO2008/099786
PCT Pub. Date: Aug. 21, 2008

(65) Prior Publication Data
US 2010/0318845 A1    Dec. 16, 2010

(30) Foreign Application Priority Data

Feb. 13, 2007   (JP) ................................ 2007-031883

(51) Int. Cl.
*G06F 11/00*   (2006.01)
(52) U.S. Cl. ........................... 714/42; 714/6.1; 714/6.32
(58) Field of Classification Search .................. None
See application file for complete search history.

(56) References Cited

U.S. PATENT DOCUMENTS

| 4,342,084 A | * | 7/1982 | Sager et al. ..................... 714/42 |
| 5,838,893 A | * | 11/1998 | Douceur ..................... 714/6.32 |
| 6,192,487 B1 | * | 2/2001 | Douceur ..................... 714/6.13 |

FOREIGN PATENT DOCUMENTS

| JP | 62-002339 A | 1/1987 |
| JP | 62-243045 A | 10/1987 |
| JP | 3-127241 A | 5/1991 |
| JP | 3-265951 A | 11/1991 |
| JP | 3-271844 A | 12/1991 |
| JP | 2000132462 A | 5/2000 |

OTHER PUBLICATIONS

International Search Report for PCT/JP2008/052173 mailed Apr. 22, 2008.

* cited by examiner

*Primary Examiner* — Michael Maskulinski

(57) ABSTRACT

Upon occurrence of a memory error which is difficult to correct, CPU interrupts a process under execution in response to interrupt signal output from error detection device, and transfers the control to the OS. The OS references attributes of a page stored in a page frame which has suffered the memory error. When read-only is indicated, physical memory management table is updated to set the page frame, which has suffered the error, into a disabled state. Then, page table is updated such that a virtual page stored in the page frame which has suffered the error is not assigned to any page frame, followed by resumption of the execution of the process. After execution of the process is resumed, a page fault process is invoked to store the virtual page which has encountered the memory error in another normal page frame.

9 Claims, 13 Drawing Sheets

MEMORY FAILURE RECOVERY METHOD, INFORMATION PROCESSING APPARATUS, AND PROGRAM

This application is the National Phase of PCT/JP2008/052173, filed Feb. 8, 2008, which is based upon and claims priority under Japanese Patent Application No. 2007-031883 filed Feb. 13, 2007, the disclosure of which is incorporated herein by reference in its entirety.

TECHNICAL FIELD

The present invention relates to a memory failure recovery method in an information processing apparatus, and more particularly, to a memory failure recovery method, an information processing apparatus, and a program which accommodate a memory error that is difficult to correct when it occurs during the execution of a process.

BACKGROUND ART

An example of a memory failure recovery method in an information processing apparatus is described in JP-2000-132462A (hereinafter called "Document 1"). In the following, the memory failure recovery method described in Document 1 will be described with reference to FIGS. 1 and 2.

Referring to FIG. 1, the information processing apparatus described in Document 1 comprises CPU 101, main storage device 102, error detection device (ECC) 103, service processor 104, storage device (ROM) 105 for the service processor, auxiliary storage device 109, and data bus 108 which interconnects these components.

In the information processing apparatus having such a configuration, when an error occurs in a program area of main storage device 102 while the system is operating, a process shown in FIG. 2 is executed. First, error detection device 103 detects the occurrence of the memory error, and confirms the contents of the memory error (S101). A circuit called ECC (Error Check and Correct) is used in error detection device 103. ECC is an error detection and correction circuit which can detect that an erroneous value is recorded in a memory and corrects the erroneous value to a correct value. While a normal ECC is capable of correcting only one bit of error, some other types of ECCs are capable of correcting two bits or multiple bits of error. In Document 1, a normal ECC (capabilities to correct only one bit) is used. When a one-bit error is detected (NO at S102), an error correction is performed by the ECC (S103), followed by termination of the process.

When the error extends over two bits or more, error detection device 103 generates interrupt signals 106, 107 to CPU 101 and service processor 104 to temporarily halt CPU 101 (S104) or to request service processor 104 to execute a recovery process. Service processor 104 acquires data at an address at which the memory error has occurred and data at the address preceding thereto, from a backup file which resides within auxiliary storage device 109 (S105), and writes these data into a recovery area on main storage device 102 (S106). Next, service processor 104 writes a branch instruction into the address immediately before the memory address at which the error has occurred for branching to the data written into the recovery area, and writes a branch instruction immediately after the data written into the recovery area for branching to the address next to the address at which the memory error has occurred in main storage device 102 (S107). Then, service processor 104 changes the value of a program counter to the address immediately before the address at which the memory error has occurred (the address at which the branch instruction has been written) (S108), and releases the temporary halt instruction for CPU 101 (S109).

As CPU 101 resumes its execution, the branch instruction is executed at the address which has been set immediately before the address at which the memory error has occurred, causing CPU 101 to execute a program with those backup data written into the recovery area instead of the data at the address at which the memory error has occurred and data at the address preceding thereto in main storage device 102, and subsequently branch to the data immediately after the address at which the memory error has occurred in main storage device 102. In this way, a program can be continuously executed even if main storage device 102 suffers a memory error which is difficult to correct.

DISCLOSURE OF THE INVENTION

In the conventional memory failure recovery method described above, an execution program is rewritten such that the recovery area is accessed by a branch instruction instead of accessing a memory device of the main storage device which has suffered a memory error that is difficult to correct. Therefore, when a plurality of execution programs are operating as is the case with a multi-task, or when an execution program contains a plurality of instructions which access a memory area in which a failure is present, an additional branch instruction must be executed each time an access is made, giving rise to a problem of increased overhead. In particular, when the aforementioned technique is applied to a computer such as a personal computer which employs a paging-based virtual storage tube, wherein a certain page of a certain program is stored in a page frame which includes a memory device which has suffered a memory error difficult to correct, and wherein a memory error is caused by an access to the memory device, even if a failure is recovered by the aforementioned method, the page is wiped out from the page frame. When another program or another page of the same program is newly stored in the page frame, a similar recovery method must be again executed, resulting in even larger overhead.

Also, the memory failure recovery method described above has a problem of requiring special devices, i.e., service processor 104 and storage device 105 for the service processor, which are not frequently used in general personal computers.

Further, the memory failure recovery method described above is intended for a memory error which occurs in a program area which is only readable, and does not have the ability to recover a failure for a memory error that is difficult to correct, which occurs in a writable data area.

It is an object of the present invention to provide the capabilities to recover a memory failure without rewriting an execution program or without requiring special devices such as a service processor and a storage device for the service processor, when a memory error that is difficult to correct occurs in an area which is only readable in a computer such as a personal computer which relies on paging to manage virtual storage.

A memory failure recovery method of the present invention for achieving the above object is a memory failure recovery method in an information processing apparatus employing a virtual storage scheme for dividing a virtual address space and a physical address space into pages and page frames to manage the virtual address space and physical address space using a page table and a physical memory management table, wherein the method includes interrupting execution of a process by an interrupt when a memory error that is difficult to correct occurs during the execution of the process, referencing an attribute of a page stored in a page frame which suffers the memory error, from the page table, updating the physical memory management table to set the page frame which suffers the memory error to a disabled state, when the page is read-only, and updating the page table such that the page will not be allocated to any of the page frames, and resuming the execution of the process.

Also, an information processing apparatus of the present invention for achieving the above object employs a virtual storage scheme for dividing a virtual address space and a physical address space into pages and page frames to manage the virtual address space and physical address space using a page table and a physical memory management table. The apparatus comprises an error detection device configured to detect a memory error in a main storage device to generate an interrupt signal, and a CPU configured to receive the interrupt signal, wherein the CPU interrupts the execution of a process upon receipt of the interrupt signal during the execution of the process, references an attribute of a page stored in a page frame which suffers the memory error, from the page table, updates the physical memory management table to set the page frame which suffers the memory error to a disabled state, when the page is read-only, updates the page table such that the page will not be allocated to any of the page frames, and resumes the execution of the process.

Also, a program of the present invention for achieving the above object is directed to a computer employing a virtual storage scheme for dividing a virtual address space and a physical address space into pages and page frames to manage the virtual address space and physical address space using a page table and a physical memory management table. The program causes the computer to interrupt execution of a process by an interrupt when a memory error occurs during the execution of the process, reference an attribute of a page stored in a page frame which suffers the memory error, from the page table, update the physical memory management table to set the page frame which suffers the memory error to a disabled state, when the page is read-only, update the page table such that the page will not be allocated to any of the page frames, and resume the execution of the process.

According to the present invention, in a computer such as a personal computer which relies on paging to manage virtual storage, if a memory error that is difficult to correct occurs in an area which is a read-only area, the memory failure can be recovered without rewriting an execution program or without requiring special devices such as a service processor, a storage device for the service processor, and the like. The reason for this is as follows. When the attribute of a page stored in a page frame which suffers a memory error is read-only, the page frame is set to a disabled state, and the page table is updated such that a virtual page will not be allocated to any page frame before the execution of a process is resumed, thereby intentionally invoking a page fault process through which the virtual page which has encountered the memory error is allocated to another page frame which is free of memory failure.

BEST MODE FOR CARRYING OUT THE INVENTION

In the following, the present invention will be described in connection with the best mode for carrying out the same, but prior to this, a virtual storage system based on a paging scheme will be described, in particular, with a focus placed on a swap function and a page fault function.

The virtual storage system based on the paging scheme is a system which divides a logical address space (virtual address space) provided by the architecture of a computer into fixed-length areas called pages and divides a main storage into page frames (page frames) of the same size as well, manages a correspondence of virtual addresses to main storage addresses in units of pages through a page table, and dynamically converts virtual addresses to physical addresses by an address conversion mechanism at the time that a process is executed. An entry corresponding to each page within the page table contains attributes of the page, a present bit indicating whether or not the page exists in a main storage device, and the entry contains a page frame number when the page exists in the main storage device, (contains the address of a page saved in a swap area on an auxiliary storage device when the page does not exist in the main storage device).

In the course of an address conversion by the address conversion mechanism, when the present bit is "1" (when the page is present in the main storage device), the conversion is performed as it is from a virtual address to a physical address, whereas when the present bit is "0" (when the page is not present in the main storage device), a page fault interrupt is generated, causing the control to transition to an operating system (hereinafter called the "OS"). The OS transfers necessary pages from the auxiliary storage device to an unused page frame of the main storage device, and rewrites the page table in accordance therewith in the page fault process. When no unused page frame exists in the main storage device, some page on the main storage device is written out into a swap area on the auxiliary storage device in accordance with a predetermined page replacement algorithm, before the pages are read. The process for writing out pages into a swap area is called the "swap process."

Figure 1:
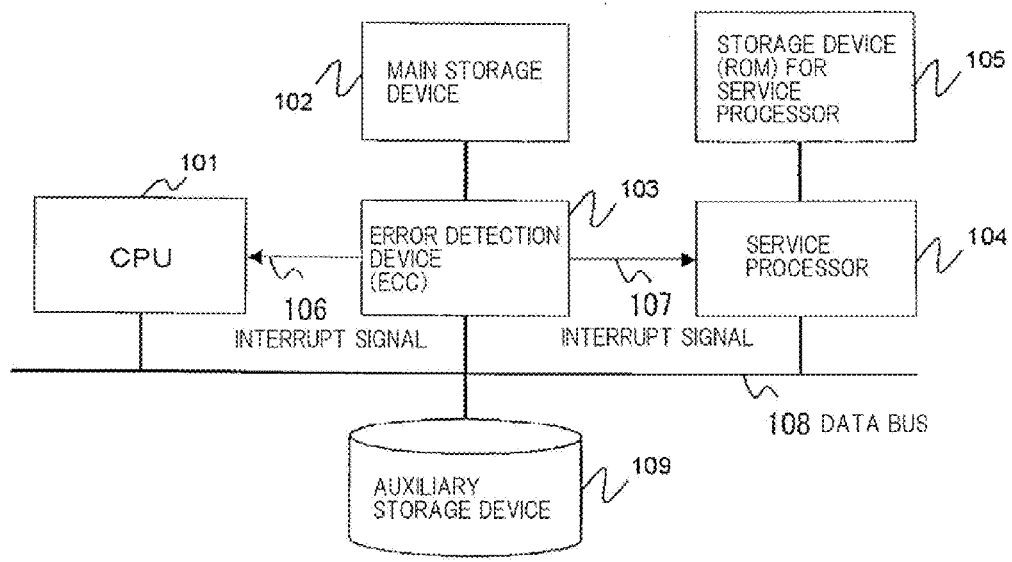
[FIG. 1] A block diagram showing the configuration of an information processing apparatus described in Document 1.
Figure 2:
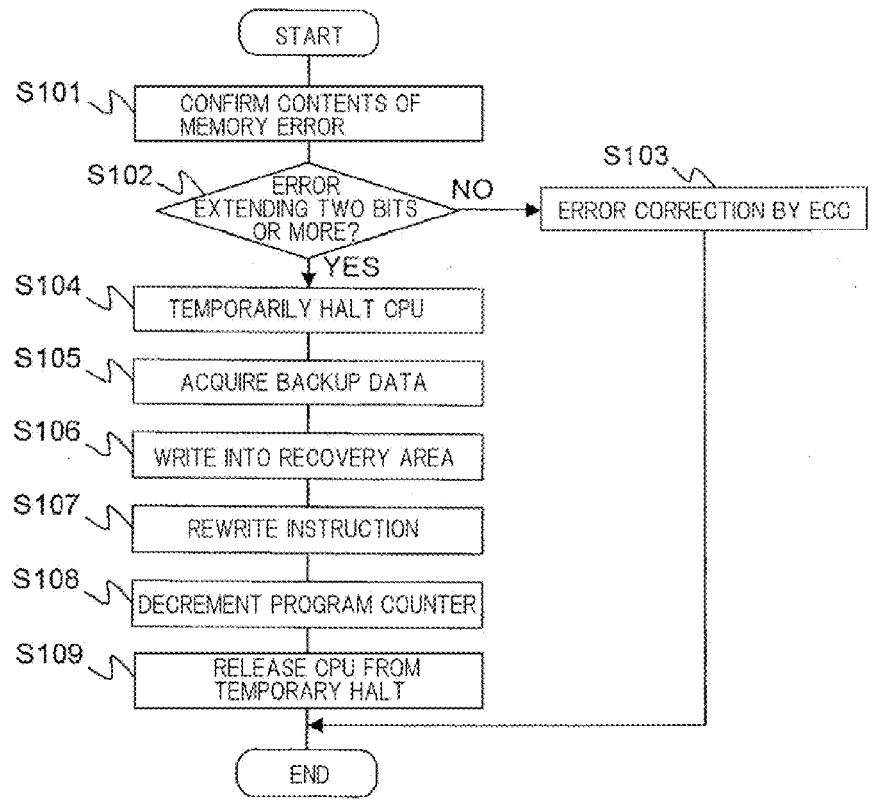
[FIG. 2] A flow chart showing a failure recovery procedure executed by the information processing apparatus described in Document 1.
Figure 3:
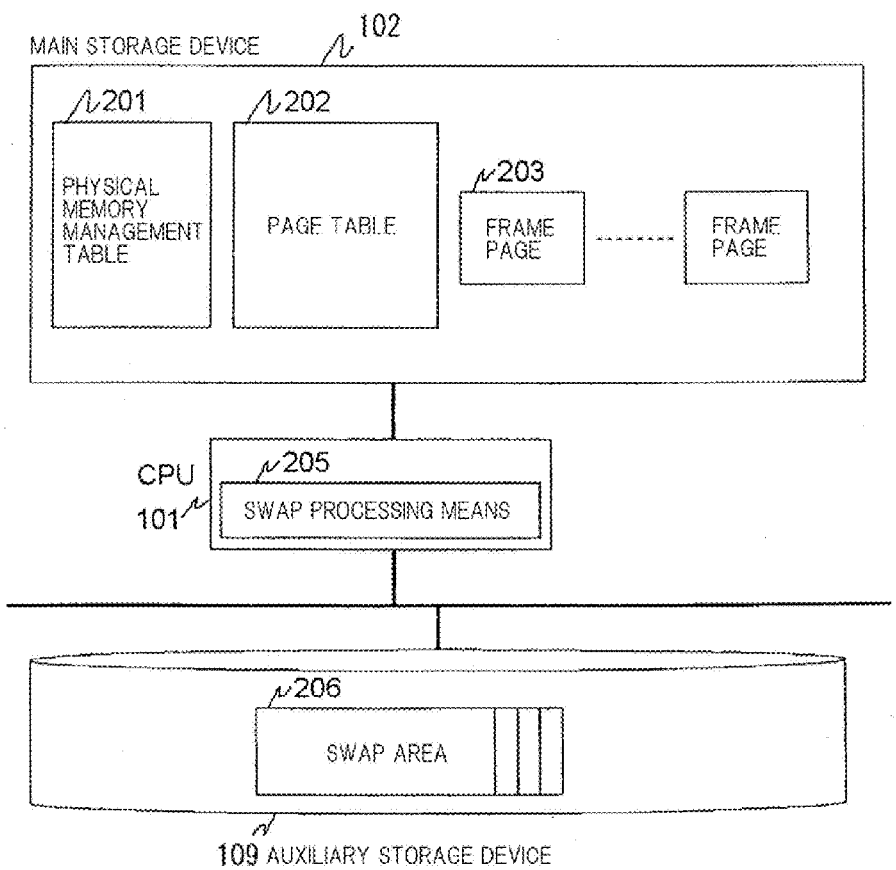
[FIG. 3] A block diagram showing an exemplary configuration of an information processing apparatus which performs a swap process.

The swap process will be described with reference to FIG. 3. FIG. 3 is a block diagram showing an exemplary configuration of an information processing apparatus which performs the swap process, where this information processing apparatus comprises CPU 101, main storage device 102, and auxiliary storage device 109. CPU 101 includes swap processing means 205. Main storage device 102 includes physical memory management table 201, page table 202, and a plurality of page frames 203. Auxiliary storage device 109 includes swap area 206.

Physical memory management table 201 is a table for managing the state in which state page frame 203 is situated. Page table 202 is a table for converting a virtual memory address to a physical memory address, and is generated for each process. A process reads/writes data by specifying a virtual memory address. When a process specifies a virtual memory address to access data, the OS converts the virtual memory address to a physical memory address using page table 202. In this way, the process can access a main storage (also called a "physical memory") area indicated by the physical memory address. The physical memory is managed in units of blocks which have the same size as a page, and a physical memory area equivalent to one page comprises page frame 203. Swap area 206 is a temporary storage area located in auxiliary storage device 109, and is an area for temporarily saving the contents of the physical memory therein. An access to swap area 206 is made in units of page frames.

Figure 4:
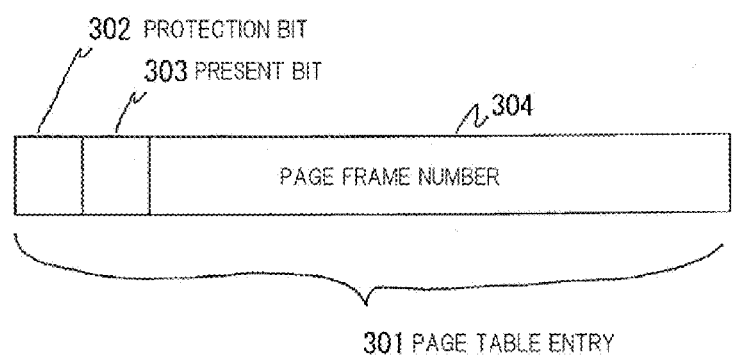
[FIG. 4] A configuration diagram of a page table entry.

Page table 202 comprises page table entry 301 shown in FIG. 4. Page table entry 301 comprises protection bit 302, present bit 303, and page frame number 304. A virtual memory address is logically divided into two parts, an entry number (virtual page number) and an offset in page table entry 301. When a virtual memory address is converted to a physical memory address, the page number of the virtual memory address is confirmed to acquire page table entry 301 corresponding thereto. Then, page frame number 304 is acquired within page table entry 301, and the offset is coupled to that page frame number 304 to generate a physical memory address. Protection bit 302 describes an attribute of a page to be accessed. The attribute of a page includes types of "only readable," "writable," and "readable and writable." Present bit 303 is a bit for discriminating whether or not a page to be accessed is present in the physical memory. When not present in the physical memory, the contents can be temporarily saved in swap area 206 by the swap process.

Figure 5:
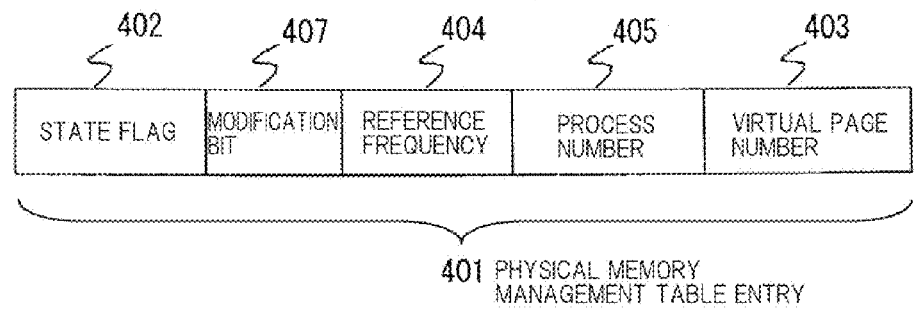
[FIG. 5] A configuration diagram of a physical memory management table entry.

Physical memory management table 201 comprises physical memory management table entry 401 shown in FIG. 5. Physical memory management table entry 401 comprises state flag 402, modification bit 407, reference frequency 404, process number 405, and virtual page number 403. Each page frame 203 is uniquely given a page frame number. The page frame number coincides with the entry position on physical memory management table 201. In other words, the first entry on physical memory management table 201 is management information for page frame 203 having page frame number 1.

State flag 402 is a flag representative of the state of pertinent page frame 203 such as "in use," "not used," "disabled" and the like. Reference frequency 404 is a value representative of the frequency at which data stored in the page frame is used, and typically stores an elapsed time since the last access. Modification bit 407 is a bit indicative of whether or not the contents of pertinent page frame 203 have been rewritten, and is set to "1" when they have been rewritten and to "0" when not rewritten. A method of utilizing modification bit 407 will be illustrated below. First, a physical memory area (page frame) is allocated for a process. At the time when the physical memory area is allocated, data has not been written into the physical memory area, so that modification bit 407 remains to be "0." Then, modification bit 407 changes to "1" at the time when the process writes some data into the pertinent memory area. Then, when the data is preserved in a file, modification bit 407 returns to "0." Thus, modification bit 407 indicates "0" when the same data as data on the physical memory exists in another device such as a disk, and "1" when such data does not exist. Process number 405 and virtual page number 403 within physical memory management table entry 401 indicate a process which references pertinent page frame 203, and the number of the virtual page.

Figure 6:
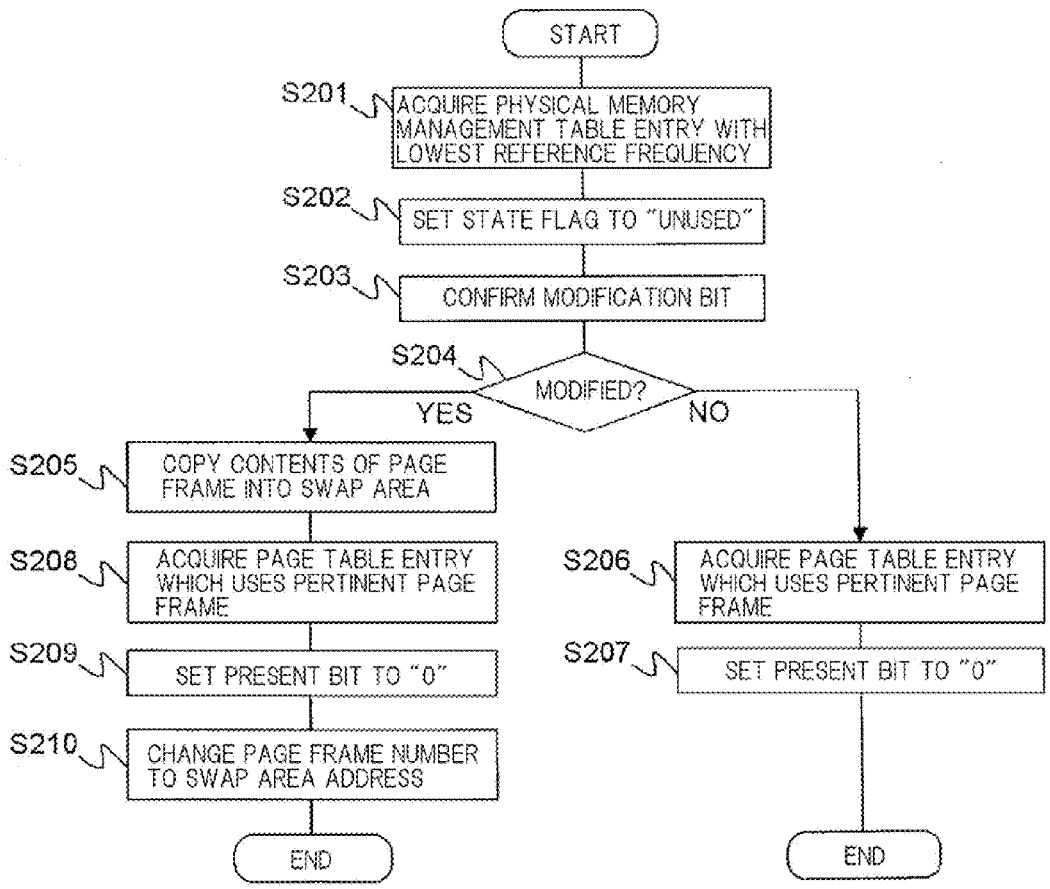
[FIG. 6] A flow chart showing a procedure of the swap process.

A procedure of the swap process is shown in FIG. 6. As described above, the swap process is started when an unused page frame for reading a new page does not exist in the main storage device. First, physical memory management table entry 401 having lowest reference frequency 404 is acquired (S201). Next, state flag 402 of this physical memory management table entry 401 is set to "unused" state (S202). Next, modification bit 407 is confirmed in this physical memory management table entry 401 (S203). When the modification bit is "1" (modified) (YES at S204), the contents (page) of this page frame 203 are copied into swap area 206 (S205).

Next, reference is made to process number 405 and virtual page number 403 within physical memory management table entry 401 to acquire page table entry 301 corresponding to the process number and virtual page number (S208). Then, present bit 303 of this page table entry 301 is set to "0" (S209), and page frame number 304 is changed to the address of swap area 206 into which page frame 203 has been copied (S210).

When the modification bit is "0" (NO at S204), the data need not be copied into the swap area, so that the processing at S206 and S207 is executed. The processing at S206 and S207 is the same as the processing at S208 and S209.

Through the foregoing swap process, the contents of page frame 203 are temporarily saved on a disk.

Next, the page fault process will be described. The page fault process is started by an interrupt which is generated when present bit 303 of page table entry 301 is "0" at the time that a process is accessing data using a virtual memory address. Present bit 303 is "0" when page frame 203 which is to be accessed is in the following three cases:

(1) contents have been saved in a disk through a swap process;

(2) contents of the page frame have been erased through a swap process from a page frame in which text mapping is being performed; and (3) no physical memory has been allocated.

The foregoing case (1) appears as described in the aforementioned swap process. The foregoing case (2) occurs when a save into swap area 206 is not needed in the swap process. "Text mapping" refers to copying the contents of execution program file 603 stored on a disk into arbitrary page frame 203 in the "read-only" state. Text mapping does not involve a rewriting data when pertinent page frame 203 is subjected to the swap process. Stated another way, since the contents of page frame 203 exist in execution program file 603, the contents of page frame 203 need not be copied into swap area 206. The foregoing case (3) appears when memory allocation is delayed by the OS. Even if a memory allocation is requested by the user, a memory area is not immediately provided for the user. Actually, a memory area is allocated at the time when the user is going to write data into a preserved memory area. In the following, a description will be given of specific operations of the page fault process.

Figure 7:
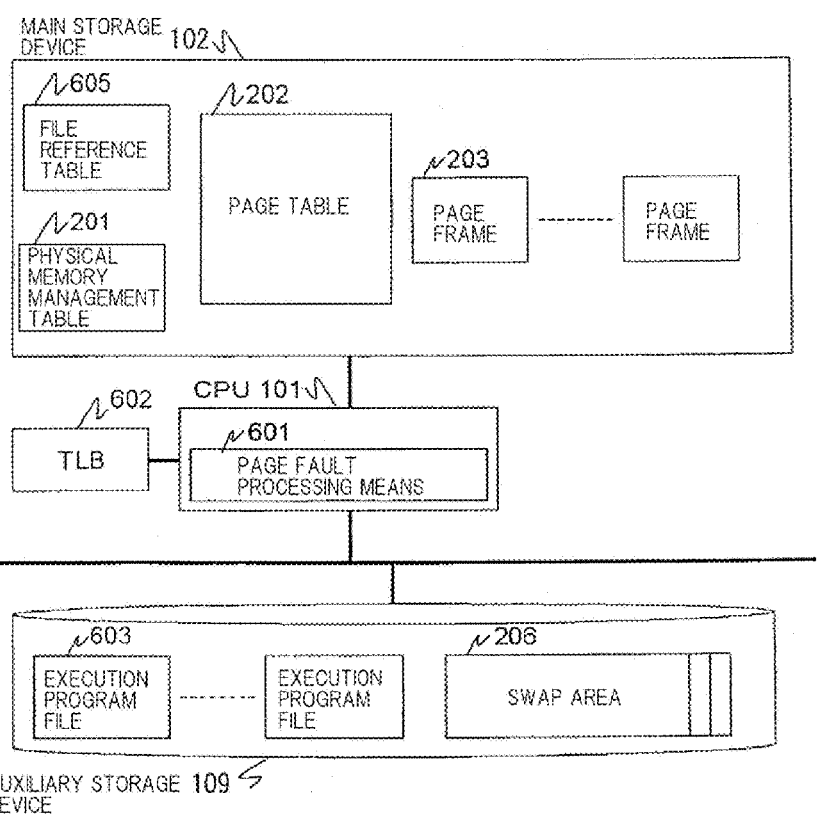
[FIG. 7] A block diagram showing an exemplary configuration of an information processing apparatus which performs a page fault process.

FIG. 7 is a block diagram showing an exemplary configuration of an information processing apparatus which performs the page fault process, where information processing apparatus comprises CPU 101, main storage device 102, and auxiliary storage device 109. CPU 101 includes page fault processing means 601. Main storage device 102 includes physical memory management table 201, page table 202, a plurality of page frames 203, and file reference table 605. Auxiliary storage device 109 includes swap area 206 and execution program file 603. Also, CPU 101 is provided with TLB (Translation Lookaside buffer) 602.

Figure 8:
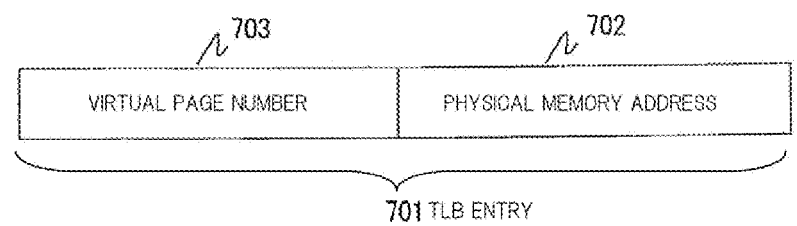
[FIG. 8] A configuration diagram of a TLB entry.

TLB 602 is a quick conversion table for virtual page numbers and main storage page frame numbers. Since a high load is involved in a process of converting a virtual memory address to a physical memory address using page table 202 which resides in main storage device 102, a pair of once converted virtual page numbers and main storage page frame numbers is preserved in TLB 602, such that the virtual memory address, when accessed the next time, will be converted to the physical memory address using TLB 602. The contents of TLB 602 are all erased each time a process is switched to another. TLB 602 comprises at least one TLB entry 701. FIG. 8 shows the configuration of TLB entry 701. TLB entry 701 is a set of virtual page numbers 703 and physical memory addresses (page frame number) 702.

Figure 9:
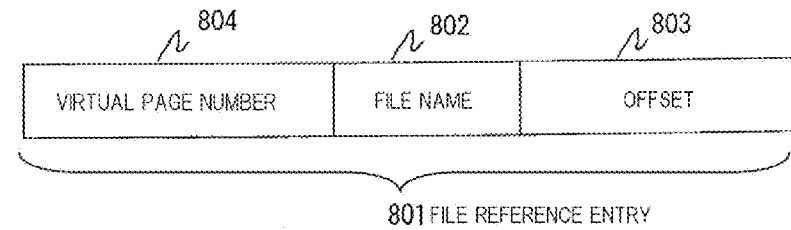
[FIG. 9] A configuration diagram of a file reference entry.

File reference table 605 is a table for indicating which page in which file has been utilized by each virtual page used by a process in the event of file mapping. File reference table 605 comprises file reference entry 801 as shown in FIG. 9. File reference entry 801 comprises virtual page number 804, file name 802, and offset 803. Offset 803 refers to an offset from the head of execution program file 603. File reference table 605 is created for each process.

Figure 10:
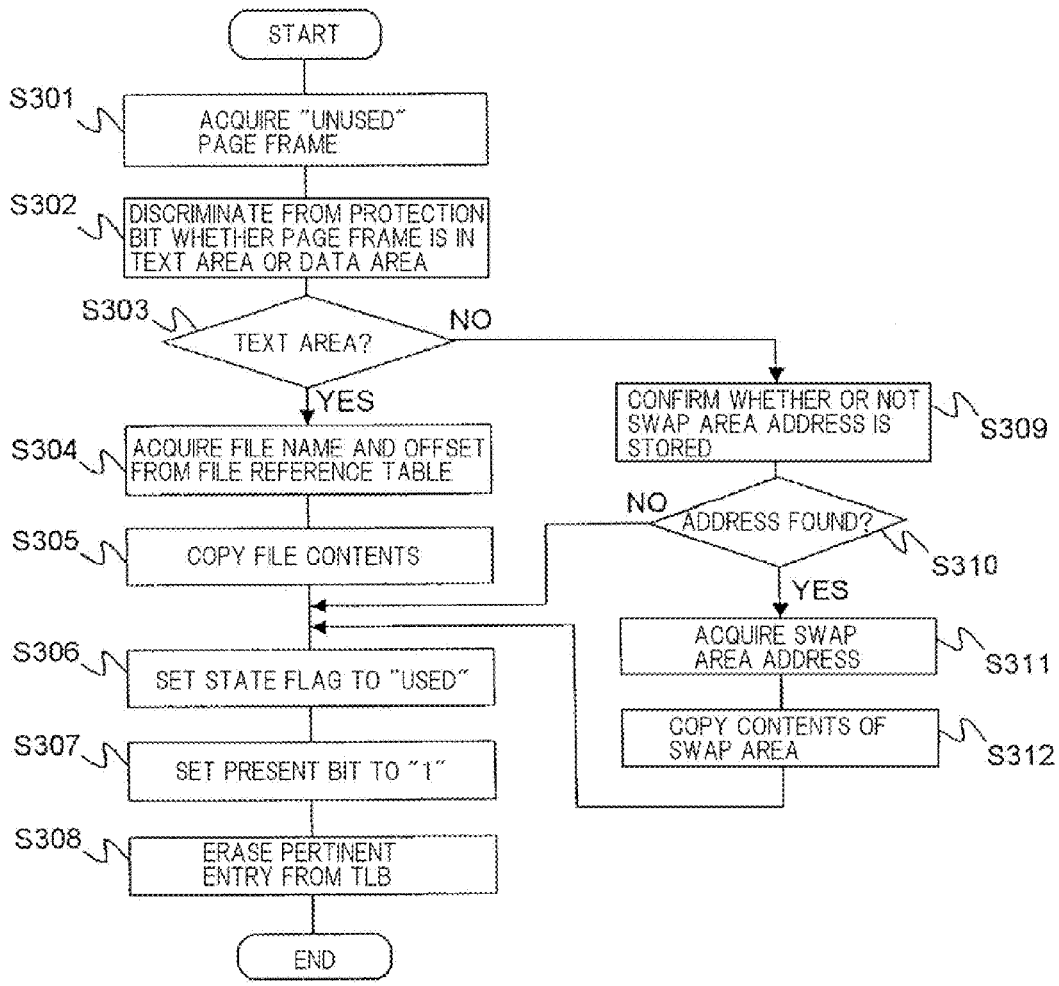
[FIG. 10] A flow chart showing a procedure of the page fault process.

FIG. 10 shows a procedure of the page fault process. The page fault process is started at the time present bit 303 indicates "0" in page table entry 301 associated with a virtual memory address when the virtual memory address is converted to a physical memory address. First, "unused" page frame 203 is acquired from physical memory management table 201 (S301). In this event, if any unused page frame 203 is not available, the aforementioned swap process is performed to generate an unused page frame.

Next, it is determined from protection bit 302 on page table entry 301 whether a text area (read-only) or a data area (readable and writable) is decided (S302). When a text area is concerned (YES at S303), an entry which stores a virtual page number coincident with a pertinent virtual page number is acquired within file reference table 605 to retrieve file name 802 and offset 803 therefrom (S304). Then, pertinent contents are retrieved from pertinent execution program file 603 in auxiliary storage device 109 using file name 802 and offset 803, and copied into page frame 203 (S305). Next, state flag 402 in physical memory management table entry 401 is set to "used" (S306), and present bit 303 in page table entry 301 is set to "1" (S307). Next, an entry having the same virtual page number 703 is erased from TLB 602 (S308). Then, the page fault process is terminated.

If a text area is not decided (NO at S303), it is confirmed whether or not a swap area address has been stored in page table entry 301. A swap area address is stored at page frame number 304 in page table entry 301 if a swap process has been performed even once, when present bit 303 is "0." Accordingly, a swap area address, if stored (YES at S310), is acquired (S311), the contents of swap area 206 are copied into pertinent page frame 203 (S312), and processing is executed from step S306 to S308. If no swap area address is stored (NO at S310), steps S311 and S312 are not executed, but instead processing is executed from step S306 to step S308 because an access is made to an area which has not been allocated.

Next, the best mode for carrying out the present invention will be described in detail with reference to the drawings.

First Exemplary Embodiment

Figure 11:
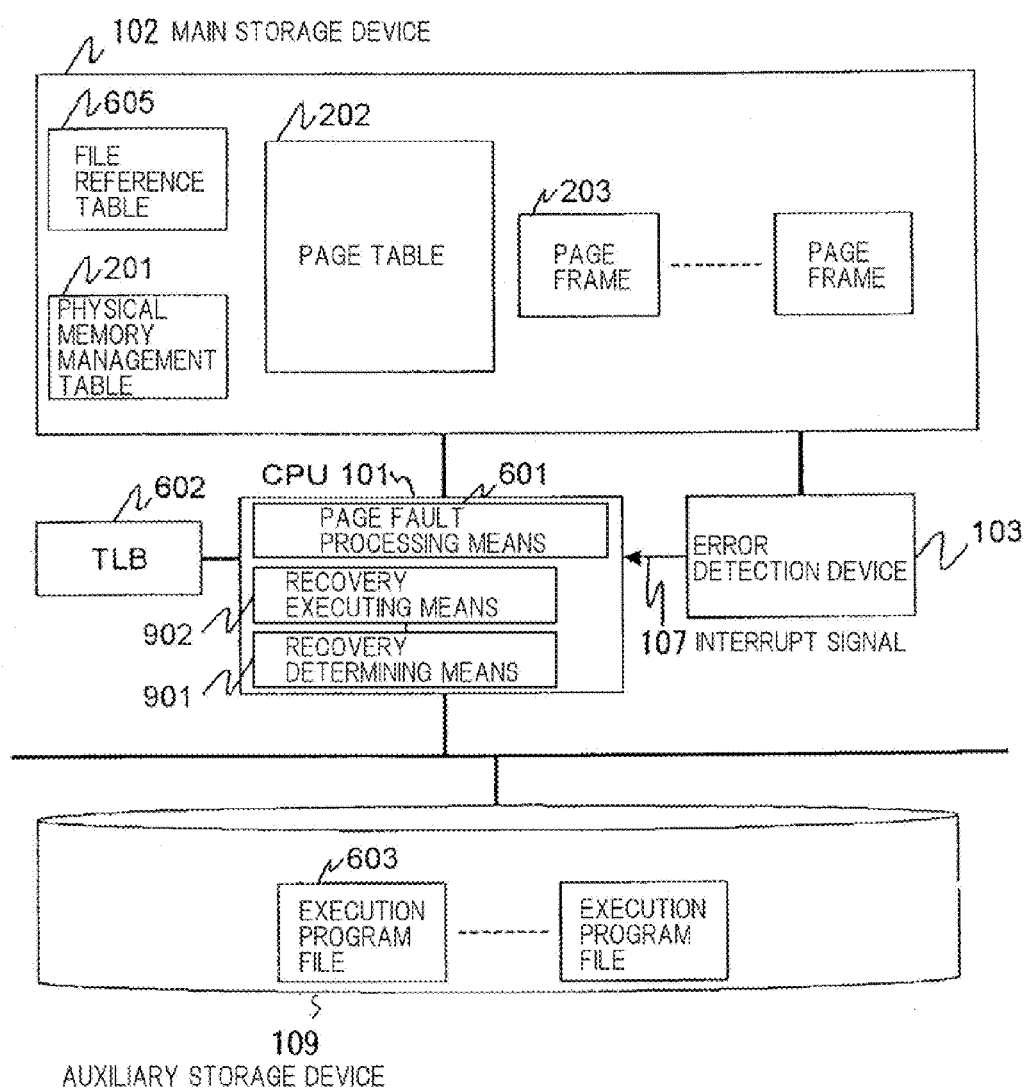
[FIG. 11] A block diagram of a first exemplary embodiment of the present invention.

Referring to FIG. 11, an information processing apparatus according to a first exemplary embodiment of the present invention comprises CPU 101, main storage device 102, error detection device 103, auxiliary storage device 109, and TLB 602. CPU 101 is provided with page fault processing means 601, recovery determining means 901, and recovery executing means 902. Main storage device 102 contains physical memory management table 201, page table 202, a plurality of page frames 203, and file reference table 605. Auxiliary storage device 109 stores execution program file 603. These components are the same as those described above except for recovery determining means 901 and recovery executing means 902.

Recovery determining means 901 and recovery executing means 902 are implemented in the OS as one function together with page fault processing means 601.

Recovery determining means 901 is means for receiving interrupt signal 107 transmitted from error detection device 103 to determine whether or not a detected error can be recovered. This recovery determining means 901 determines that a recovery is possible when a page stored in a page frame which suffers a memory error has a read-only attribute, and otherwise determines that a recovery is impossible. Interrupt signal 107 sent from error detection device 103 includes a physical memory address at which an error has occurred. Recovery determining means 901 identifies pertinent page frame 203 from this physical memory address, further identifies information (process number and virtual page number) on a virtual page stored in that page frame, and confirms which page attribute the virtual page has. Specifically, recovery determining means 901 references protection bit 302 of pertinent page table entry 301, determines that a recovery is possible when "read-only" is indicated, i.e., when this page frame 203 is used for text mapping, and instructs recovery executing means 902 to execute a recovery. When the page attribute is not only readable but is writable, recovery determining means 901 determines that a recovery according to this exemplary embodiment is impossible. In this event, subsequent processing may be contemplated, for example, forced abortion of a computer, forced abortion of only a process which has encountered an error, and the like, but the present invention is not particularly so limited.

Recovery executing means 902 receives a recovery execution instruction from recovery determining means 901 to recover an error. Specifically, recovery executing means 902 references physical memory management table entry 401 for managing the state of a page frame including a physical memory address at which an error has occurred to retrieve information (process number and virtual page number) on a process which is using this page frame. Then, recovery executing means 902 acquires pertinent page table entry 301 on page table 202 corresponding to the retrieved process number and virtual page number, erases the contents of page frame number 304 in this page table entry 301, and sets present bit 303 to "0." Further, recovery executing means 902 sets state flag 402 of physical memory management table entry 401 to "unusable" so as not to again use page frame 203 in which the error has been detected, in the event of text mapping. Upon resuming the execution of a process which has encountered the error after performing the foregoing processing, the aforementioned page fault process is invoked, and a text area is revealed from the state of protection bit 302, so that the text mapping is executed.

Next, the operation of this exemplary embodiment will be described in detail with reference to a flow chart shown in FIG. 12.

When a memory error occurs on main storage device 102 during execution of a certain process, error detection device 103 detects the memory error (S401). Upon detection of an error in the physical memory, error detection device 103 transmits interrupt signal 107 including a physical memory address at which the error has been detected to CPU 101. Upon receipt of interrupt signal 107, CPU 101 interrupts the process under execution, and starts the process by recovery determining means 901.

First, recovery determining means 901 determines whether or not the error has occurred in a text area (S402). Specifically, recovery determining means 901 retrieves information (process number 405 and virtual page number 403) on a process which references the page frame from physical memory management table entry 401 corresponding to page frame 203 identified from the physical memory address at which the error has been detected, to acquire page table entry 301 corresponding to the process number and virtual page number. Next, recovery determining means 901 references protection bit 302 in this page table entry 301 to determine whether page frame 203, which has suffered the error, is a read-only text area or a readable and writable data area.

Figure 12:
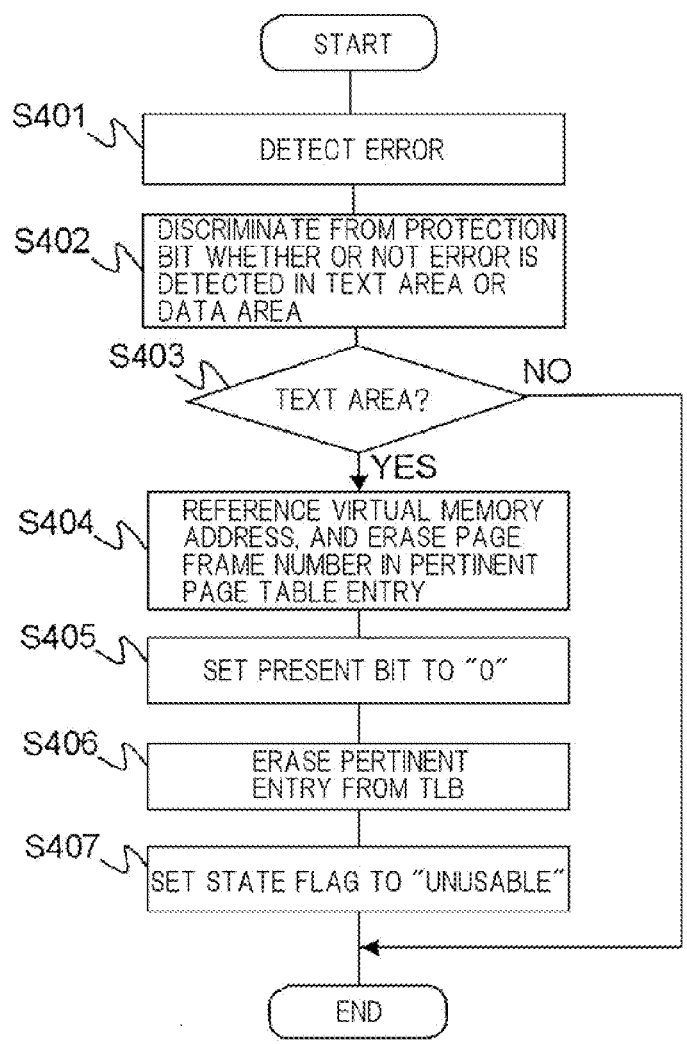
[FIG. 12] A flow chart showing an operation procedure of the first exemplary embodiment of the present invention.

Next, when the area which has suffered the error is not a text area (NO at S403), recovery determining means 901 determines that error recovery is impossible and terminates the process shown in FIG. 12. When the area is a text area, recovery determining means 901 determines that error recovery is possible, and transfers the control to recovery executing means 902.

Recovery executing means 902 erases the contents of page frame number 304 in acquired page table entry 301 (S404), and sets present bit 303 to "0" (S405). Next, recovery executing means 902 erases the contents of the pertinent entry (entry which retains the correspondence between the address on the physical page at which the error has occurred and an address on a virtual page) in TLB 602 (S406), and sets state flag 402 in this physical memory management table entry 401 to "unusable" (S407). Then, recovery executing means 902 terminates the process shown in FIG. 12, and resumes the execution of the interrupted process.

The execution of the process is resumed from the virtual address at which the error has occurred. In this event, since the pertinent entry (a TLB entry which stores the physical memory address at which the error has occurred) has been erased from TLB 602 at step S406, the address is converted with reference to page table entry 301 without fail. Then, referring to page table entry 301, since its present bit 303 has been set to "0" at step S405, a page fault interrupt is generated to again interrupt the execution of the process, causing page fault processing means 601 to start a page fault process. In this page fault process, processing is executed from step S301 to step S308 shown in FIG. 10, whereby the content of a pertinent page in execution program file 603 is copied into an unused page frame except for the page frame in which the error has been detected, present bit 303 in page table entry 301 is written to "1," and the number of the frame page is set in page frame number 304, followed by resumption of the execution of the process. In this way, an address conversion is executed using pertinent page table entry 301, and a memory access is made to a location different from the location of the physical memory at which the error has occurred, to continue execution of the process.

Next, a description will be given of a processing procedure when using an ECC error detection device capable of correcting a one-bit error in this exemplary embodiment.

Figure 13:
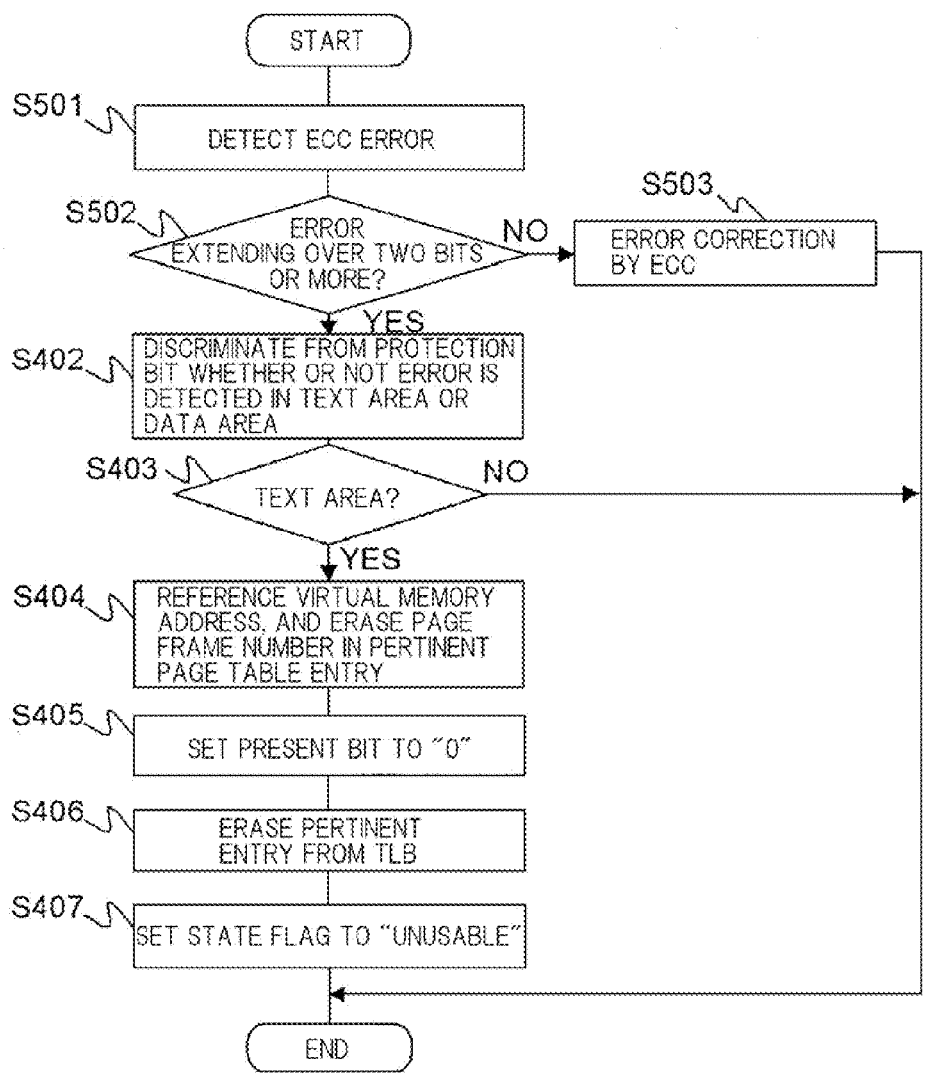
[FIG. 13] A flow chart showing a processing procedure when an ECC error detection device capable of correcting a one-bit error is employed in the first exemplary embodiment of the present invention.

FIG. 13 is a flow chart showing a processing procedure when an ECC error detection device capable of correcting a one-bit error is employed in this exemplary embodiment of the present invention. Here, an ECC error detection device capable of correcting a one-bit error is employed for error detection device 103. In this event, a one-bit error can be automatically modified in hardware, so that when error detection device 103 detects an ECC error (S501), an error correction is performed by ECC (S503) when the detected error is a one-bit error (NO at S502), followed by termination of the process in FIG. 13. In this event, interrupt signal 107 is not output. When the error extends over two bits or more (YES at S502), interrupt signal 107 is output to execute the aforementioned processing from step S402 to step S407.

While the foregoing description has been given of the processing procedure when error detection device 103 has a function of automatically modifying one-bit errors, the exemplary embodiment may employ error detection device 103 which is capable of automatically modifying errors extending over two bits or more. In this event, when an error can be corrected, the error is corrected within error detection device 103, followed by termination of the process. When the error is difficult to correct, processing is executed at step S402 onward.

According to this exemplary embodiment, in an information processing apparatus which relies on paging to manage virtual storage, if a memory error occurs in a main storage page frame which is allocated a virtual page having a read-only attribute, the memory failure can be recovered without rewriting an execution program or without requiring special devices such as a service processor; a storage device for the service processor, and the like. The reason for the above is because a page fault mechanism is utilized to recover the memory failure by restoring a virtual page, which had been stored in a page frame in which the error was detected, in another page frame.

Second Exemplary Embodiment

Next, a second exemplary embodiment of the present invention will be described in detail with reference to the drawings.

Figure 14:
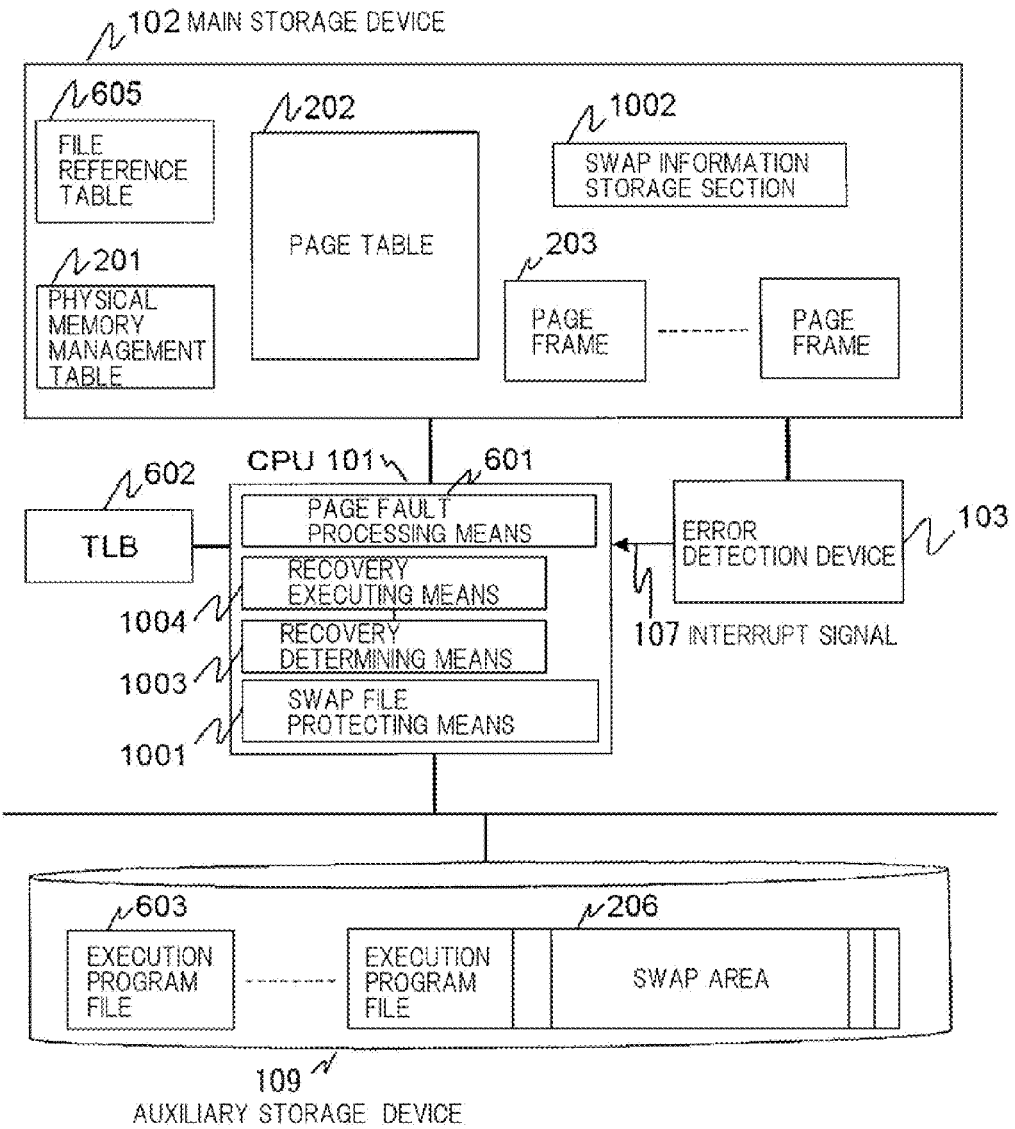
[FIG. 14] A block diagram showing a second exemplary embodiment of the present invention.

Referring to FIG. 14, an information processing apparatus according to the second exemplary embodiment of the present invention comprises CPU 101, main storage device 102, error detection device 103, auxiliary storage device 109, and TLB 602. CPU 101 is provided with page fault processing means 601, swap file protecting means 1001, recovery determining means 1003, and recovery executing means 1004. Main storage device 102 contains physical memory management table 201, page table 202, a plurality of page frames 203, file reference table 605, and swap information storage section 1002. Auxiliary storage device 109 stores execution program file 603 and swap area 206. These components are the same as those described above except for swap file protecting means 1001, recovery determining means 1003, recovery executing means 1004, and swap information storage section 1002.

Swap file protecting means 1001, recovery determining means 1003, and recovery executing means 1004 are implemented as one function of the OS together with page fault processing means 601.

Swap file protecting means 1001 is means for maintaining data stored in swap area 206 by performing a swap process without erasing the same. Data stored in swap area 206 has been erased as unnecessary data after it has been moved to a physical memory by a page fault process, but in this exemplary embodiment, the data is not erased as a way to provide data protection for data that has been corrupted by a memory failure in the physical memory to where the data has been moved. Specifically, swap file protecting means 1001 preserves data written into swap area 206 as it is until a process using pertinent page frame 203 is terminated. Also, when data is read into the physical memory through a page fault process, a swap area address stored in page frame number 304 in page table entry 301 is overwritten with the page frame number, so that the swap area address is stored in swap information storage section 1002.

Figure 15:
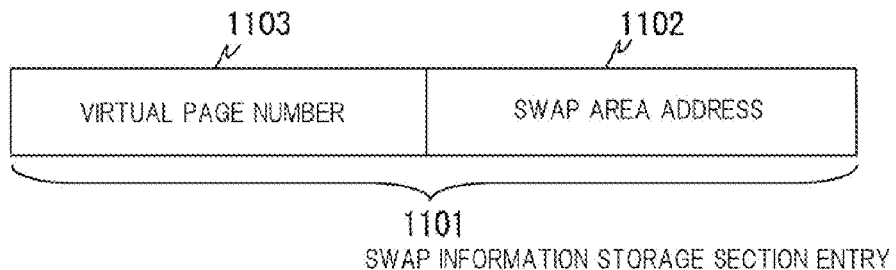
[FIG. 15] A configuration diagram of a swap information storage section entry.

Swap information storage section 1002 comprises swap information storage section entry 1101 as shown in FIG. 15. Swap information storage section entry 1101 comprises virtual page number 1103 and swap area address 1102. Swap information storage section 1002 exists for each process.

Recovery determining means 1003 is means for receiving interrupt signal 107 transmitted from error detection device 103 to determine whether or not a detected error can be recovered. This recovery determining means 1003 determines that a recovery is possible with the aid of text mapping when a virtual page stored in a page frame which suffers a memory error has a read-only attribute, in a manner similar to recovery determining means 901 in the first exemplary embodiment. Further, recovery determining means 1003 determines that a recovery is possible with a swap file when the page has the attribute of "writable," if the page frame has modification bit 407 set to "0" (not modified) and if a swap area address of a virtual page stored in the page frame has been stored in swap information storage section 1002 (i.e., a swap process has been performed even once), and otherwise determines that a recovery is impossible. When recovery determining means 1003 determines that a recovery is impossible, subsequent processing may be contemplated, for example, forced abortion of a computer, forced abortion of only the process which has encountered an error, and the like, but the present invention is not particularly so limited.

Recovery executing means 1004 receives a recovery execution instruction from recovery determining means 1003 to recover an error. Unlike the first exemplary embodiment, in this exemplary embodiment, recovery executing means 1004 receives two types of instructions from recovery determining means 1003, i.e., "recovery through text mapping" and "recovery with a swap file." The "recovery through text mapping" is performed in a procedure similar to the first exemplary embodiment. The "recovery with a swap file" involves referencing physical memory management table entry 401 for managing the state of a page frame which includes a physical memory address at which an error has occurred to retrieve a process number of a process which is using the page frame, and a virtual page number. Then, recovery executing means 1004 acquires pertinent entry 301 on page table 202 associated with the retrieved process number and virtual page number, erases the contents of page frame number 304 of this page table entry 301, and sets present bit 303 to "0." Further, recovery executing means 1004 acquires a swap area address, which was swapped the last time, from swap information storage section 1002, and writes the swap area address into the field of page frame number 304 in page table entry 301. Also, recovery executing means 1004 sets state flag 402 of physical memory management table entry 401 corresponding to pertinent page frame 203 to "unusable" so as not to again use page frame 203 in which the error has been detected. After performing the foregoing processing, the page fault process is invoked by resuming execution of a process which has encountered the memory error, and a page stored in pertinent page frame 203 in the physical memory can be reproduced in page frame 203 free of memory failure, using the contents of swap area 206.

Figure 16:
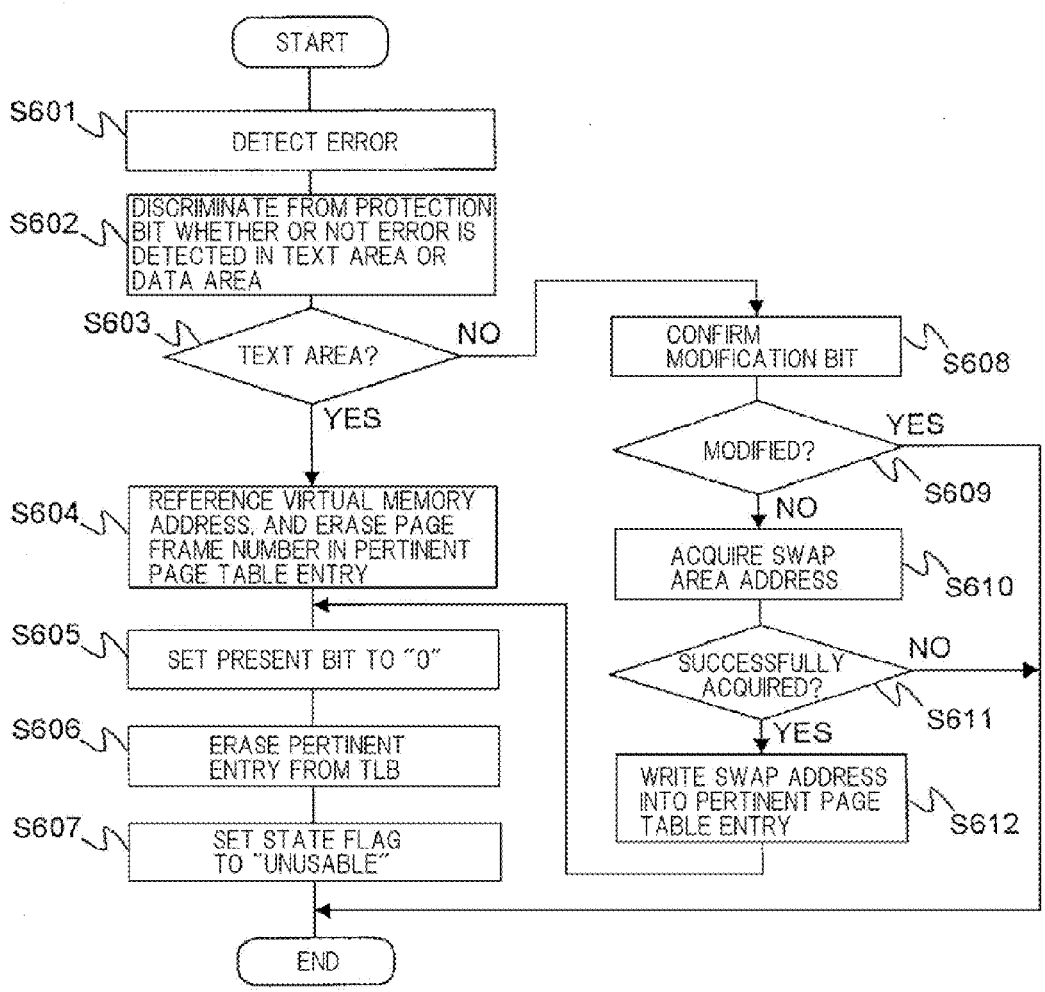
[FIG. 16] A flow chart showing an operation procedure of the second exemplary embodiment of the present invention.

Next, operation of this exemplary embodiment will be described in detail with reference to the flow chart shown in FIG. 16.

When a memory error occurs on main storage device 102 during execution of a certain process, error detection device 103 detects the memory error (S601). Upon detection of an error in the physical memory, error detection device 103 transmits interrupt signal 107, including a physical memory address at which the error has been detected, to CPU 101. Upon receipt of interrupt signal 107, CPU 101 interrupts the process under execution, and starts the process by recovery determining means 1003.

First, recovery determining means 1003 determines whether the error has occurred in a text area or in a data area (S602). Specifically, recovery determining means 1003 retrieves information (process number and virtual page number) on a process which references the page frame from physical memory management table entry 401 corresponding to page frame 203 identified from the physical memory address at which the error has been detected, to acquire page table entry 301 corresponding to the process number and virtual page number. Next, recovery determining means 1003 references protection bit 302 in this page table entry 301 to determine whether page frame 203, which is suffering the error, is a read-only text area or a readable and writable data area (S602).

When the area which has suffered the error is a text area, recovery executing means 1004 executes processing from step S604 to step S607 in a manner similar to the processing from step S404 to step S407 in the first exemplary embodiment shown in FIG. 12, to perform a recovery through text mapping.

Next, when the area which has suffered the error is not a text area but a data area (NO at S603), recovery determining means 1003 confirms modification bit 407 in pertinent physical memory management table entry 401 (S608). When the modification bit is "0" (not modified) (NO at S609), recovery determining means 1003 references swap information storage section 1002 corresponding to the pertinent process to acquire a swap area address which forms a pair with a pertinent virtual page (S610). Then, if the swap area address is successfully acquired (YES at S611), recovery determining means 1003 stores the swap area address in the field of page frame number 304 in page table entry 301 corresponding to the process and virtual page (S612), and executes processing from step S605 to step S607. Then, recovery determining means 1003 terminates the process shown in FIG. 16, and resumes the execution of the interrupted process.

On the other hand, when the modification bit is "1" (modified) (YES at S609), or the swap area address is unsuccessfully acquired (NO at S611), recovery determining means 1003 determines that a recovery is impossible. In this event, subsequent processing may be contemplated, for example, forced abortion of a computer, forced abortion of only a process which has encountered an error, and the like, but the present invention is not particularly so limited.

When execution of the interrupted process is resumed after processing has been performed from step S610 to step S612 and from step S605 to Step S607, the following operations are performed. Execution of the process is resumed from a virtual address at which the error occurred. In this event, since a pertinent entry (TLB entry which stores a physical memory address at which the error is present) has been erased from TLB 602 at step S606, an address conversion is performed without fail with reference to page table entry 301. Then, referring to page table entry 301, since its present bit 303 has been set to "0" at step S605, a page fault interrupt is generated to again interrupt the execution of the process, causing page fault processing means 601 to start a page fault process. In this page fault process, with execution of processing from step S301 to step S303, processing from step S309 to S312, and processing from step S306 to step S308, shown in FIG. 10, the contents of a pertinent page saved in swap area 206 are copied into an unused page frame except for the page frame in which the error was detected, present bit 303 in page table entry 301 is rewritten to "1," and the number of the page frame is set in page frame number 304, before the execution of the process is resumed. In this way, an address conversion is executed using pertinent page table entry 301, and a memory access is made to a location that is different from the location of the physical memory at which the error has occurred, to continue the execution of the process.

Next, a description will be given of a processing procedure when using an ECC error detection device capable of correcting a one-bit error in this exemplary embodiment.

Figure 17:
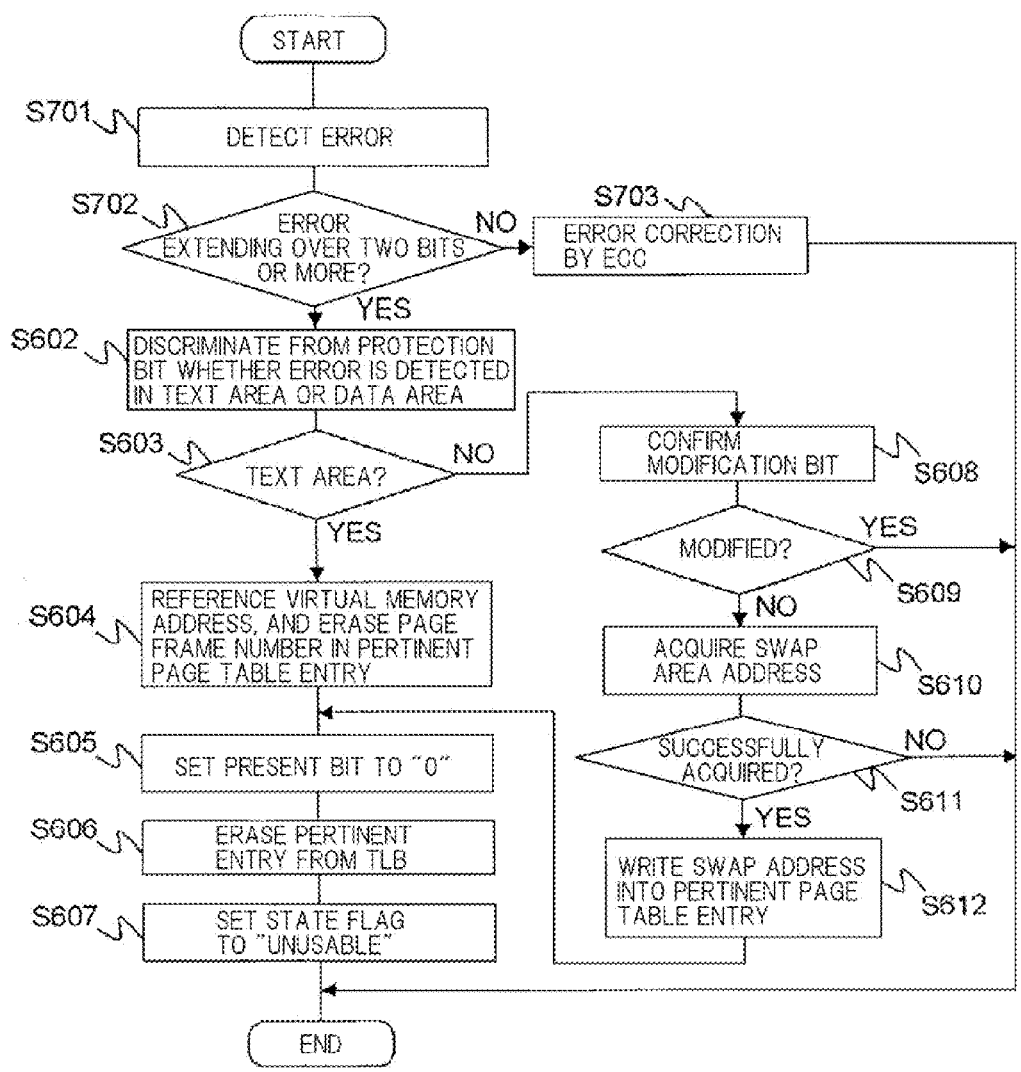
[FIG. 17] A flow chart showing a processing procedure when an ECC error detection device capable of correcting a one-bit error is employed in the second exemplary embodiment of the present invention.

FIG. 17 is a flow chart showing a processing procedure when an ECC error detection device capable of correcting a one-bit error is employed in this exemplary embodiment of the present invention. Here, an ECC error detection device capable of correcting a one-bit error is employed for error detection device 103.

In this event, a one-bit error can be automatically modified in hardware, so that when error detection device 103 detects an ECC error (S701), an error correction is performed by ECC (S703) when the detected error is a one-bit error (NO at S702), followed by termination of the process in FIG. 13. In this event, interrupt signal 107 is not output. When the error extends over two bits or more (YES at S702), interrupt signal 107 is output to execute steps S602 to S612 in the second exemplary embodiment.

While the foregoing description has been given of the processing procedure when error detection device 103 has a function of automatically modifying one-bit errors, the exemplary embodiment may employ error detection device 103 which is capable of automatically modifying errors extending over two bits or more. In this event, when an error can be corrected, the error is corrected within error detection device 103, followed by termination of the process. When the error is difficult to correct, processing is executed at step S602 onward S.

According to this exemplary embodiment, in addition to similar effects to those in the first exemplary embodiment, even in a data area, a memory failure can be recovered by recovering an erroneous page frame again in another page frame 203 with the use of data in swap area 206, provided that a swap process has been once executed and no modification has been made since the last swap process.

Example 1

Figure 18:
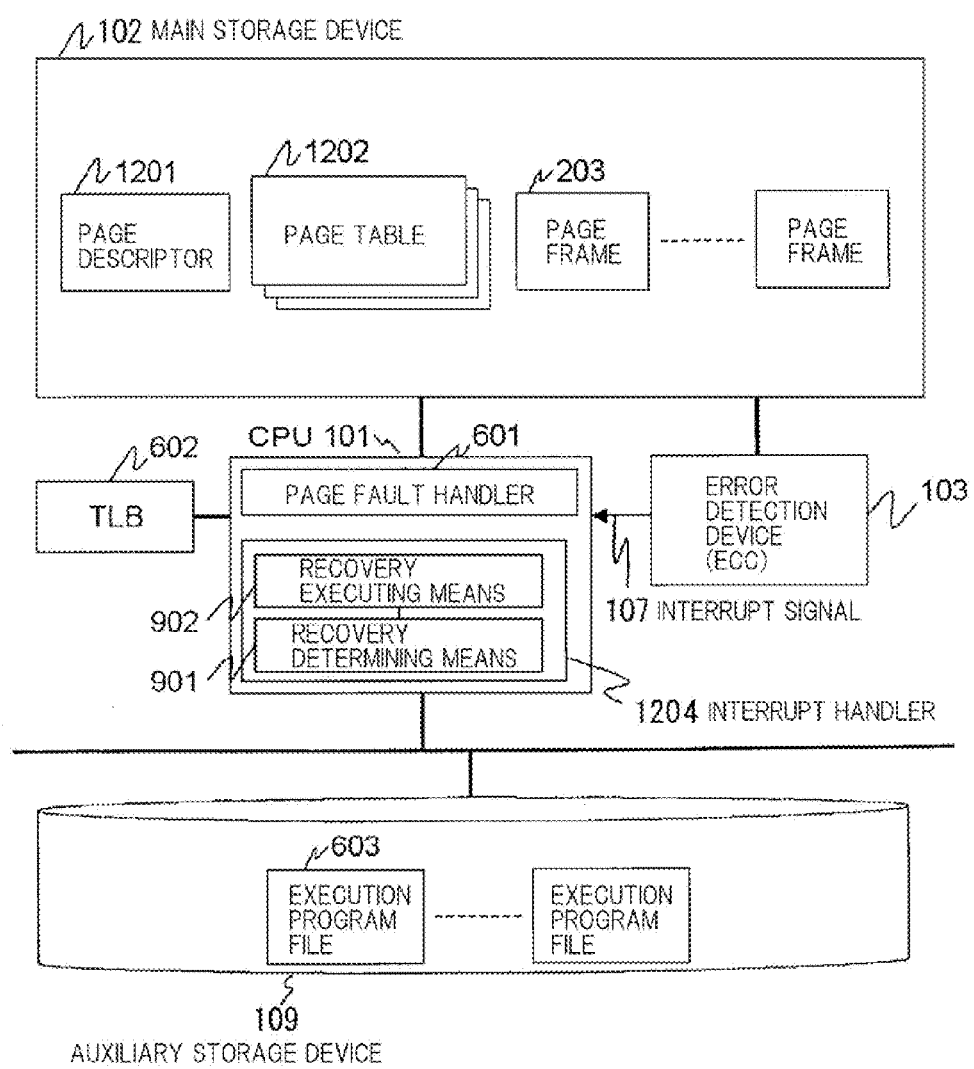
[FIG. 18] A block diagram of an example of the present invention.

Next, the operation in the best mode for carrying out the present invention will be described with reference to specific examples. The OS used in an example is Linux OS. Referring to FIG. 18, an example is applied to an information processing apparatus which comprises CPU 101, main storage device 102, error detection device (ECC) 103, auxiliary storage device 109, and TLB 602. CPU 101 comprises page fault handler 601, and interrupt handler 1204 including recovery determining means 901 and recovery executing means 902. Main storage device 102 contains page descriptor 1201, page table 1202, and page frame 203, while auxiliary storage device 109 stores execution program file 603.

Page descriptor 1201 is analogous to physical memory management table entry 401 in the exemplary embodiments. Page table 1202 is analogous to page table 202 in the exemplary embodiments. Interrupt handler 1204 receives interrupt signal 107 sent from the hardware, and executes an interrupt process in accordance with the type of interrupt signal 107 sent thereto. In regard to the present invention, interrupt handler 1204 includes recovery determining means 901 and recovery executing means 902.

Figure 19:
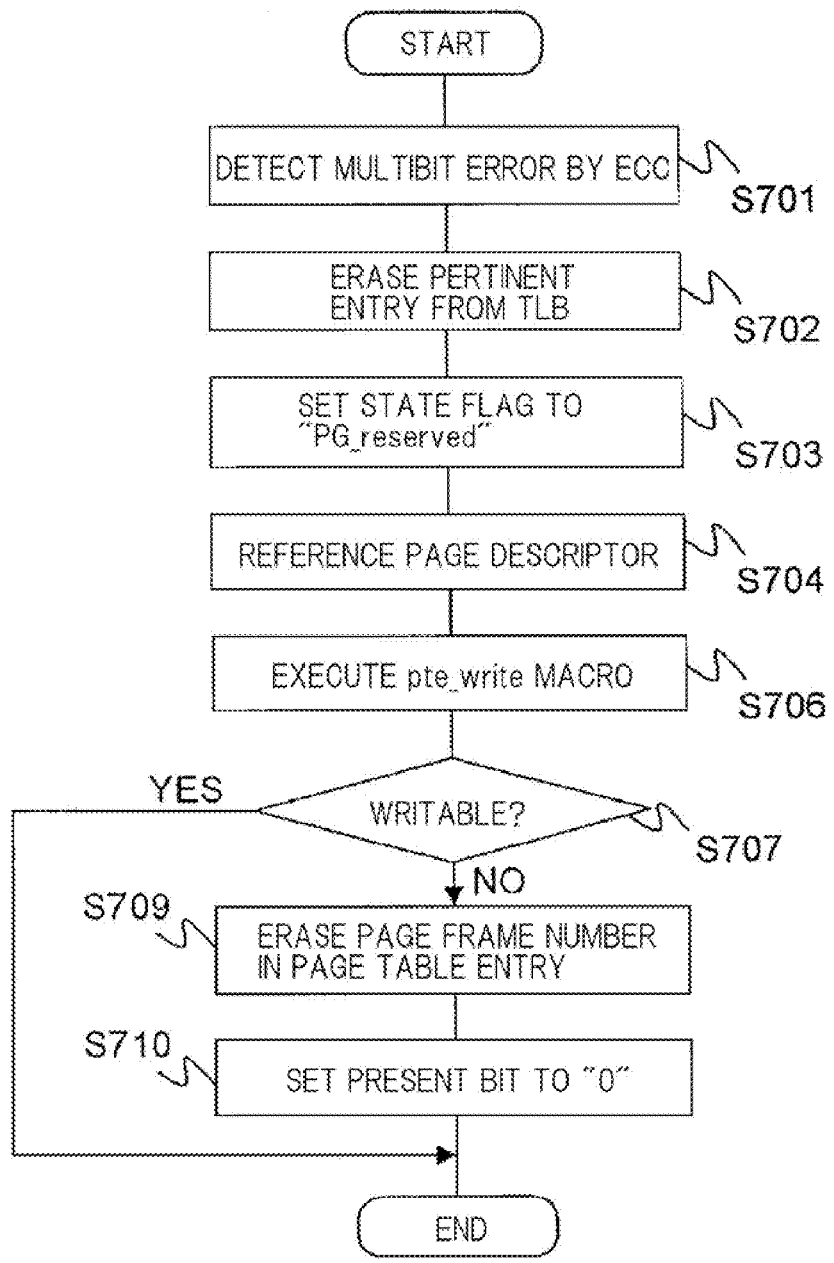
[FIG. 19] A flow chart showing an operation procedure of the example of the present invention.

Next, the operation of the example will be described in detail with reference to a flow chart shown in FIG. 19. When a memory error occurs on main storage device 102 during execution of a certain process, error detection device (ECC) 103 detects the memory error (S701). Upon detection of the memory error, interrupt signal 107 is transmitted to CPU 101. Upon receipt of interrupt signal 107, CPU 101 interrupts the process under execution, and executes interrupt handler 1204 which has been registered by the OS. In the execution process of this interrupt handler 1204, the following processing is executed by recovery determining means 901 and recovery executing means 902.

First, a pertinent entry is erased from the TLB (S702). Next, a state flag of the page descriptor is set to "PG_reserved" (S703). PG_reserved is one flag representative of the state of a page frame, and means that a pertinent page frame is disabled. Next, a page table entry which references the page frame is acquired from the page descriptor (S704), and a pte_write macro is executed for the acquired page table entry (S706). The pte_write macro is a program for determining whether or not a pertinent page frame is writable when the page table entry stores a page frame number. When writable (YES at S707), it is determined that a recovery is impossible, followed by termination of the process in FIG. 19. When not writable (S707), it is determined that a recovery is possible, the page frame number is erased in the page table entry (S709), and the present bit is set to "0" (S710). Then, the process in FIG. 19 is terminated to resume execution of the interrupted process.

While the exemplary embodiments and example of the present invention have been described above, the present invention is not limited to the contents described above, but a variety of other additional modifications can be made thereto. For example, the present invention can be applied to an information processing apparatus which comprises an inter-process memory sharing function for mapping virtual pages for a plurality of different processes to the same main storage page frame. In this event, at step S404 and step S405 shown in FIG. 12, and at step S612 shown in FIG. 16, the page frame numbers are erased, the present bits are set to "0," and swap area addresses are set in entries corresponding to virtual pages associated with all processes which share a page frame in which a memory error occurs.

In the present invention, when a memory error is detected by an error detection device such as ECC during execution of a process, the error is automatically modified if it can be corrected, whereas the CPU is interrupted if the error is difficult to correct. With this interrupt, the execution of the process is interrupted, and a determination is made on the possibility of memory recovery. It is determined that a memory failure can be recovered when an area of a physical memory (page frame) in which the memory error has occurred is an area resulting from text mapping of an execution program, and is a read-only area. In this way, in a computer such as a personal computer which relies on paging to manage virtual storage, when a memory error that is difficult to correct occurs in read-only area, the memory failure can be recovered without rewriting an execution program or without requiring special devices such as a service processor, a storage device for the service processor, and the like.

Also, in the present invention, even if a memory failure happens in a writable area, it is determined that the memory failure can be recovered, provided that the memory area has not been modified even once since it had been stored in a physical memory the last time and has once undergone a swap process. Then, the CPU excludes a pertinent physical memory area from memory allocation area of the OS, and sets the present bit in the page table to "0," thereby intentionally invoking a page fault process after execution of the process is resumed. Through the page fault process, the contents of a memory area which is suffering a failure are read from a file if text mapping is performed, or recovered from a swap area if they have undergone a swap process. In this way, in a computer such as a personal computer which relies on paging to manage virtual storage, even if a memory error that is difficult to correct occurs not only in a read-only area but also in a writable area, the memory failure can be recovered depending on a particular situation.

INDUSTRIAL AVAILABILITY

The present invention can be applied to applications such as memory failure recovery for a general personal computer which comprises a simple error detection device such as ECC.

The invention claimed is:

1. A memory failure recovery method performed by an information processing apparatus employing a virtual storage scheme for dividing a virtual address space and a physical address space into pages and page frames to manage the virtual address space and physical address space using a page table and a physical memory management table, said method comprising:
   interrupting execution of a process by an interrupt when a memory error occurs during execution of the process;
   referencing an attribute of a page stored in a page frame, which suffers the memory error, from the page table;
   updating the physical memory management table to set the page frame, which suffers the memory error, to a disabled state, when the page is read-only, and updating the page table such that the page will not be allocated to any of the page frames; and
   resuming execution of the process.

2. The memory failure recovery method according to claim 1, wherein:
   determining whether or not the page has been modified with reference to the physical memory management table when the attribute of the page is not read-only;
   setting an address of a swap area into which the contents of the page were swapped the last time into an entry of the page table corresponding to the page when the page was not modified;
   updating the physical memory management table to set the page frame which suffers the memory error to a disabled state;
   updating the page table such that the page will not be allocated to any of the page frames; and
   resuming execution of the process.

3. The memory failure recovery method according to claim 1, wherein:
   the occurring memory error is automatically corrected by an error detection device which detects the memory error when the memory error is an automatically correctable memory error, and said information processing apparatus performs the interrupt when the memory error is difficult to correct.

4. An information processing apparatus employing a virtual storage scheme for dividing a virtual address space and a physical address space into pages and page frames to manage the virtual address space and physical address space using a page table and a physical memory management table, said apparatus comprising:
   an error detection device configured to detect a memory error in a main storage device to generate an interrupt signal; and
   a CPU configured to receive the interrupt signal,
   wherein said CPU interrupts execution of a process upon receipt of the interrupt signal during execution of the process, references an attribute of a page stored in a page frame which suffers the memory error, from the page table, updates the physical memory management table to set the page frame, which suffers the memory error, to a disabled state, when the page is read-only, updates the page table such that the page will not be allocated to any of the page frames, and resumes execution of the process.

5. The information processing apparatus according to claim 4, wherein:
   said CPU determines whether or not the page has been modified with reference to the physical memory management table when the attribute of the page is not read-only, sets an address of a swap area, into which the contents of the page were swapped the last time, into an entry of the page table corresponding to the page when the page was not modified, updates the physical memory management table to set the page frame which suffers the memory error to a disabled state, updates the page table such that the page will not be allocated to any of the page frames, and resumes execution of the process.

6. The information processing apparatus according to claim 4, wherein:
   said error detection device automatically corrects the occurring memory error when the memory error is automatically correctable, and outputs the interrupt signal when the memory error is difficult to correct.

7. A non-transitory computer-readable medium containing a computer program wherein, in a computer employing a virtual storage scheme for dividing a virtual address space and a physical address space into pages and page frames to manage the virtual address space and physical address space using a page table and a physical memory management table, the program causing said computer to:
   interrupt execution of a process by an interrupt when a memory error occurs during execution of the process;
   reference an attribute of a page stored in a page frame which suffers the memory error, from the page table;
   update the physical memory management table to set the page frame, which suffers the memory error, to a disabled state, when the page is read-only, and update the page table such that the page will not be allocated to any of the page frames; and
   resume execution of the process.

8. The non-transitory computer-readable medium according to claim 7, wherein: the program further causing said computer to:

determine whether or not the page has been modified with reference to the physical memory management table when the attribute of the page is not read-only;

set an address of a swap area, into which the contents of the page were swapped the last time, into an entry of the page table corresponding to the page when the page was not modified;

update the physical memory management table to set the page frame, which suffers the memory error, to a disabled state;

update the page table such that the page will not be allocated to any of the page frames; and resume execution of the process.

9. The non-transitory computer-readable medium according to claim 7, wherein: the memory error is difficult to be automatically corrected by an error detection device.

* * * * *